June 19, 1923.
L. F. HELLMANN ET AL
1,459,098
AUTOMATIC SAFETY CONTROL FOR AIR BRAKE SYSTEMS
Filed May 10", 1920   5 Sheets-Sheet 1
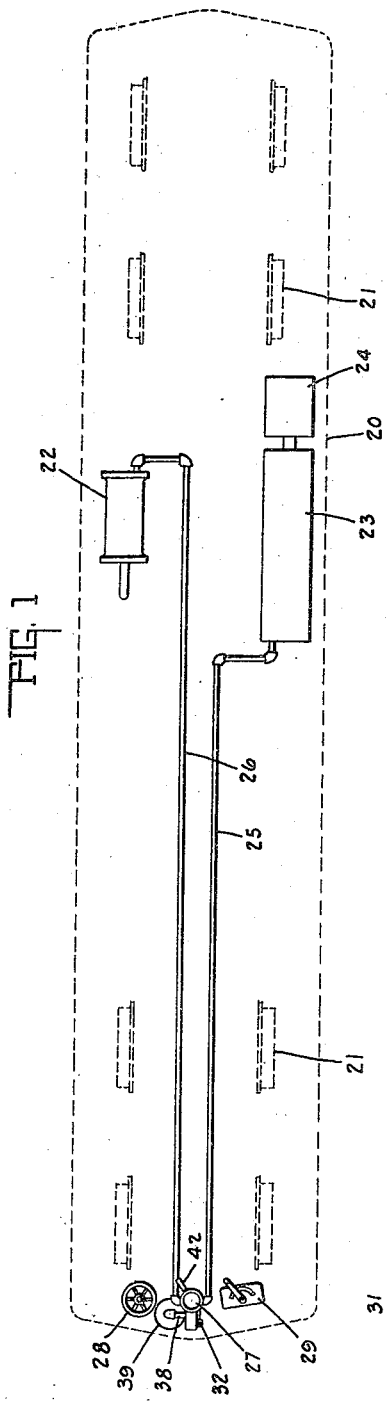
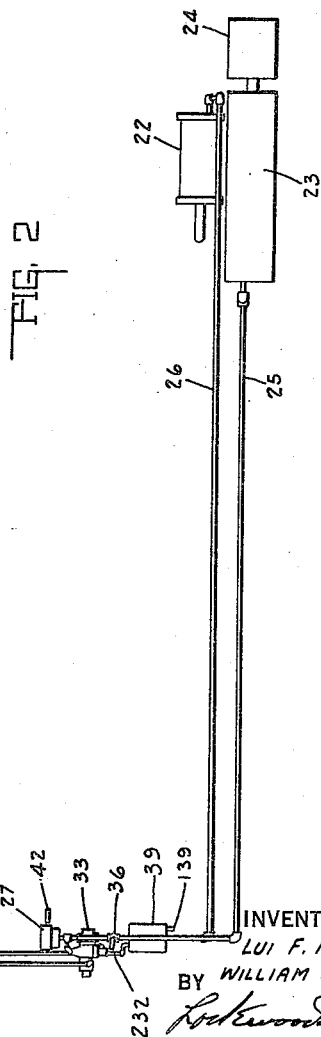
INVENTORS
LUI F. HELLMANN.
BY WILLIAM W. BAXTER.
ATTORNEYS.

June 19, 1923.
L. F. HELLMANN ET AL
1,459,098
AUTOMATIC SAFETY CONTROL FOR AIR BRAKE SYSTEMS
Filed May 10, 1920
5 Sheets-Sheet 2
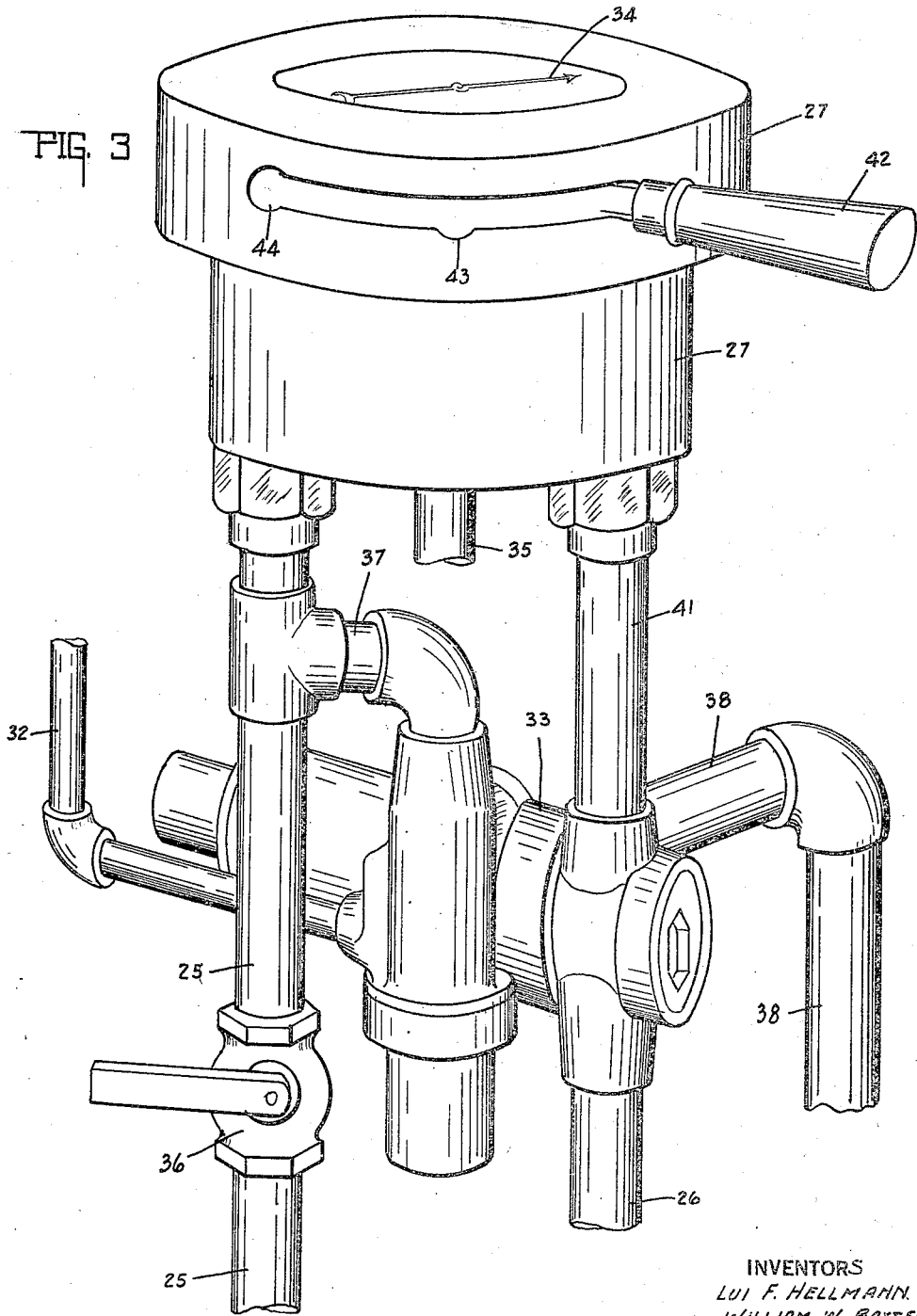
INVENTORS
LUI F. HELLMANN.
WILLIAM W. BAXTER
BY
ATTORNEYS June 19, 1923.
L. F. HELLMANN ET AL
1,459,098
AUTOMATIC SAFETY CONTROL FOR AIR BRAKE SYSTEMS
Filed May 10, 1920
5 Sheets-Sheet 3
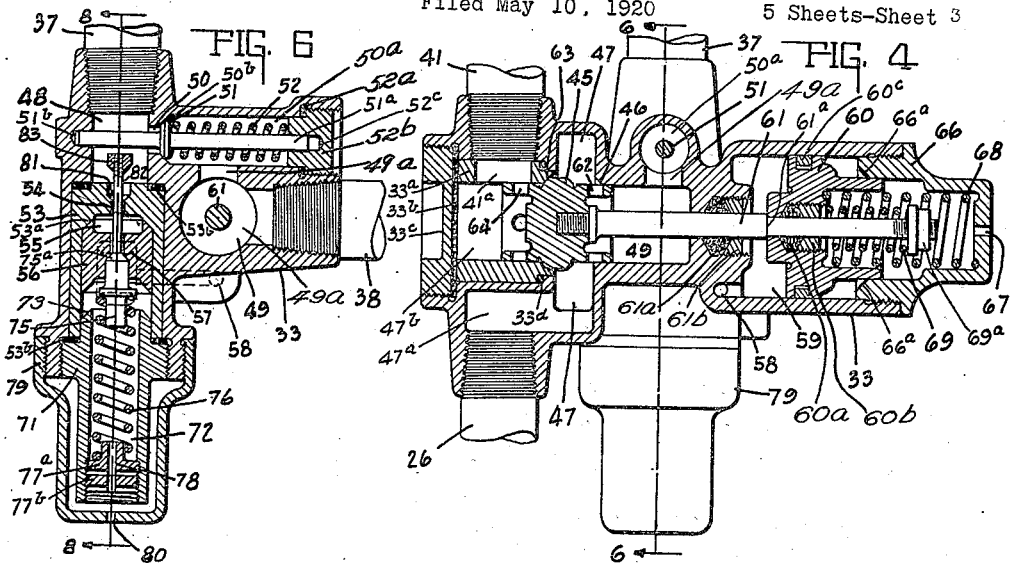
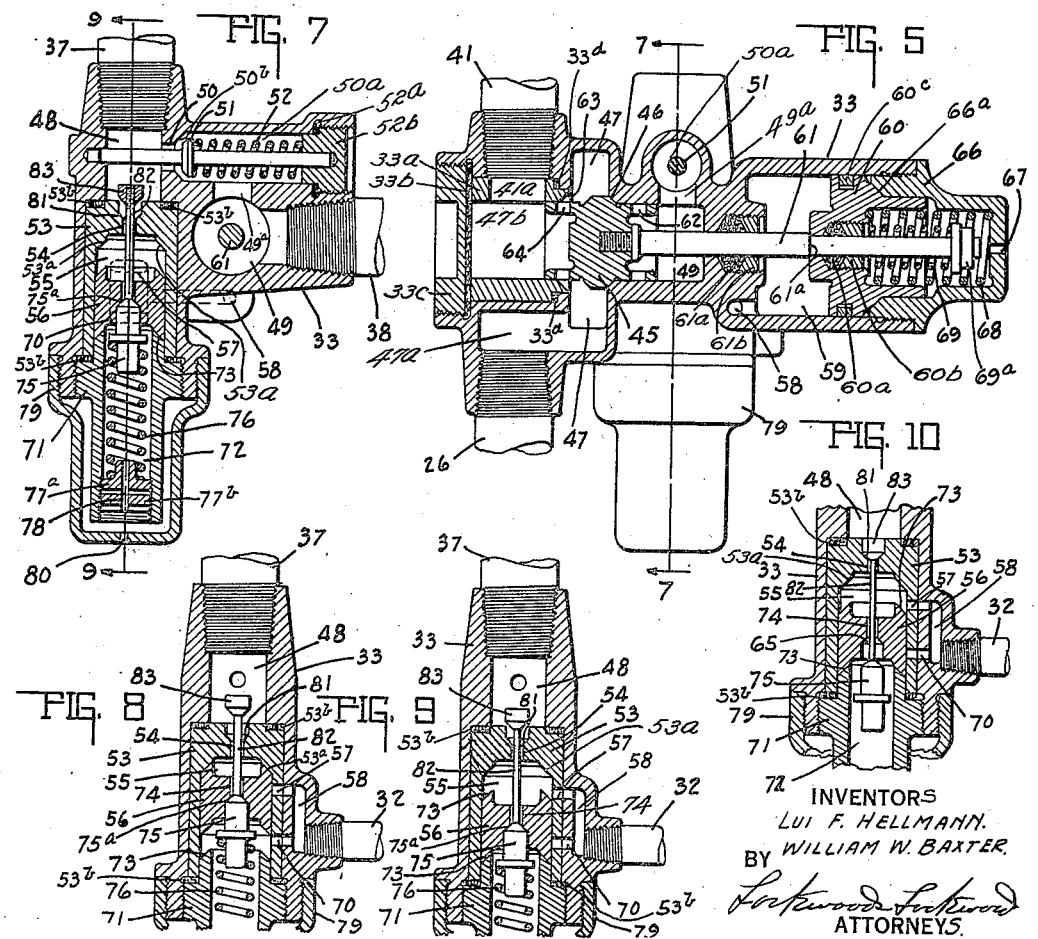
INVENTORS
LUI F. HELLMANN.
WILLIAM W. BAXTER.
BY
ATTORNEYS

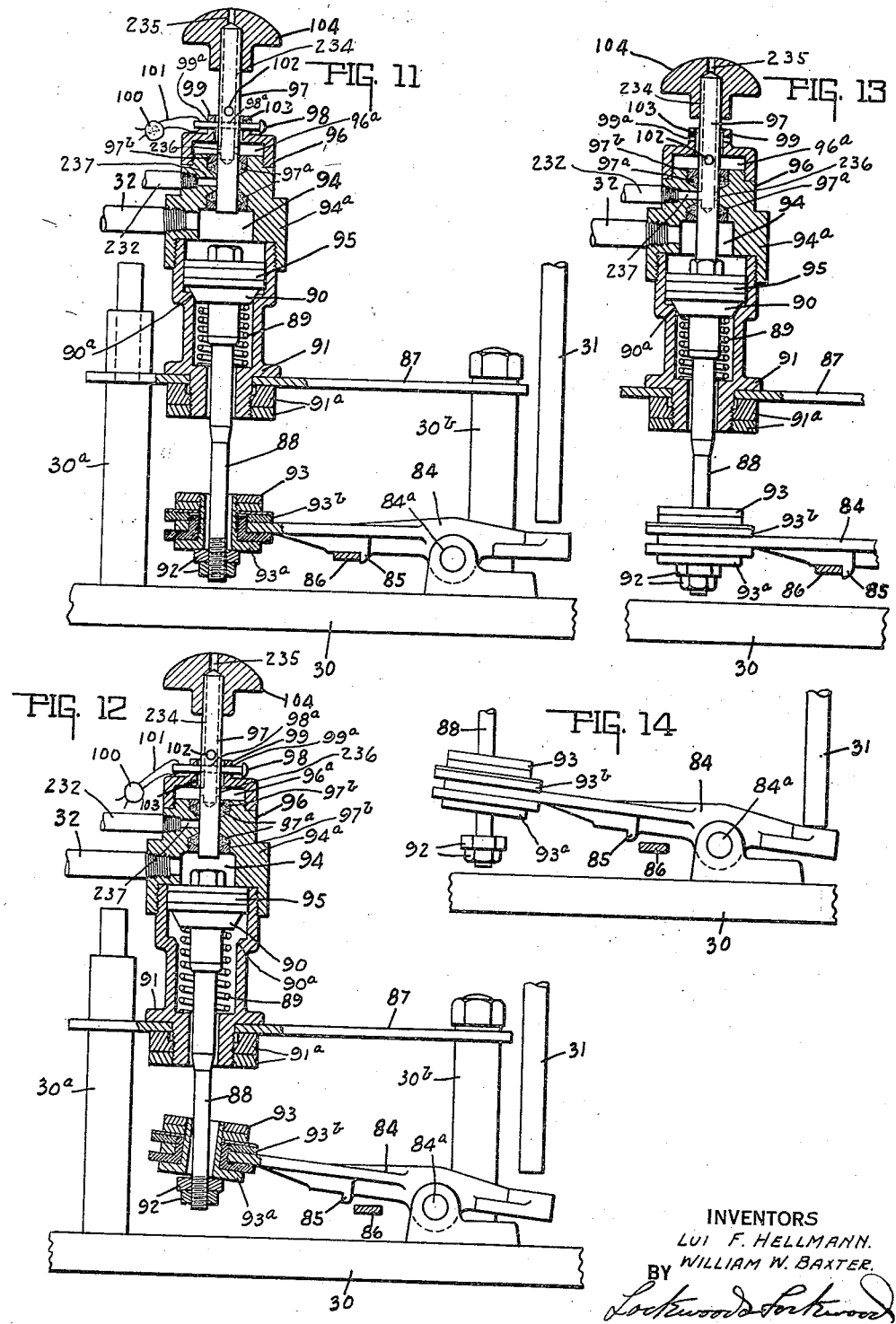

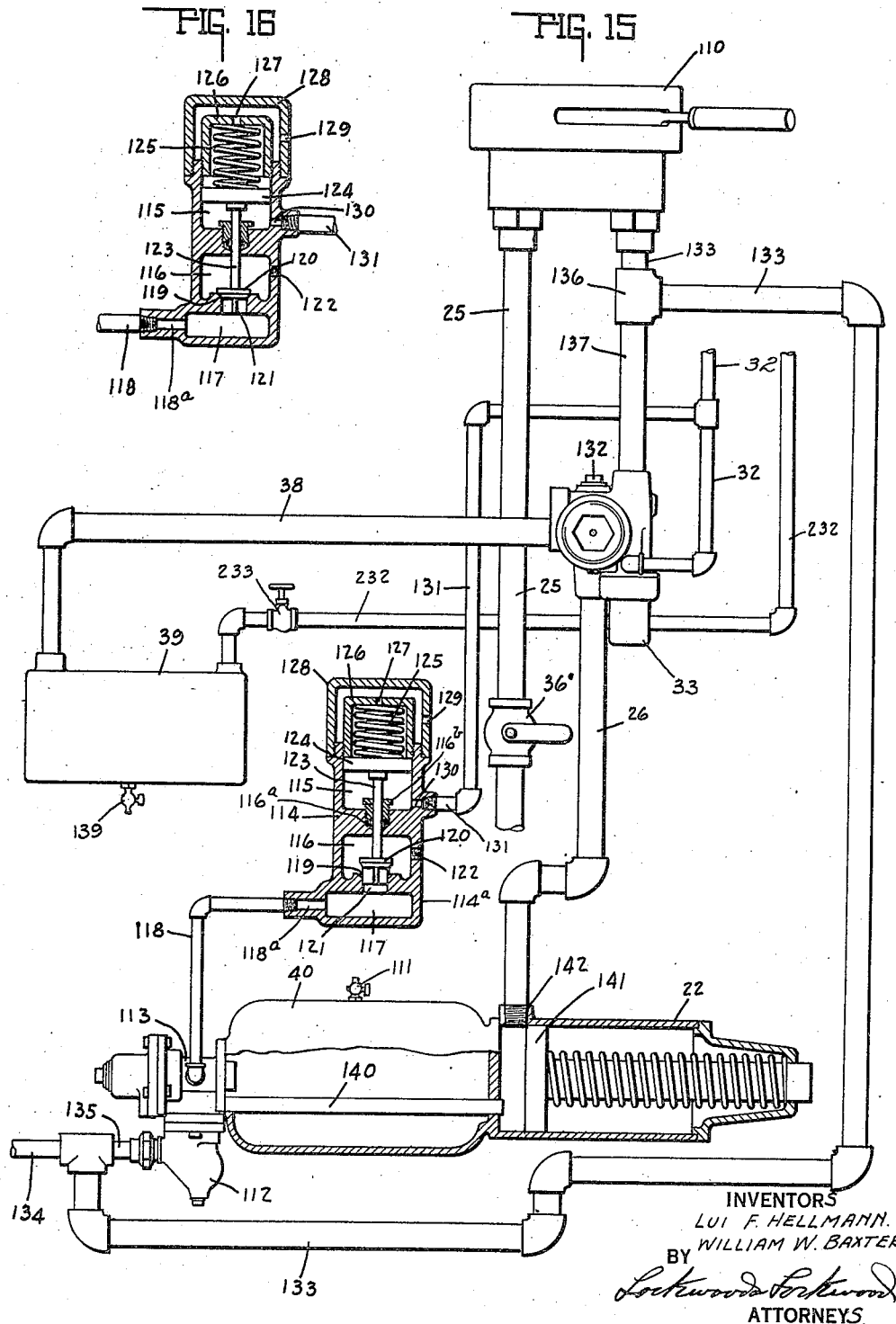

Patented June 19, 1923.

1,459,098

UNITED STATES PATENT OFFICE.

LUI F. HELLMANN AND WILLIAM W. BAXTER, OF INDIANAPOLIS, INDIANA, ASSIGNORS TO AIR BRAKE SAFETY APPLIANCE COMPANY, OF INDIANAPOLIS, INDIANA, A CORPORATION.

AUTOMATIC SAFETY CONTROL FOR AIR-BRAKE SYSTEMS.

Application filed May 10, 1920. Serial No. 380,234.

*To all whom it may concern:*

Be it known that we, LUI F. HELLMANN and WILLIAM W. BAXTER, citizens of the United States, and residents of Indianapolis, county of Marion, and State of Indiana, have invented a certain new and useful Automatic Safety Control for Air-Brake Systems; and we do hereby declare that the following is a full, clear, and exact description thereof, reference being had to the accompanying drawings, in which like numerals refer to like parts.

This invention relates to pneumatic braking system, wherein the wheels of a vehicle are equipped with pneumatically operated brakes, and means controlling the pneumatic braking system as well as the power system of the vehicle.

This invention is an improvement upon the co-pending application Serial No. 297,107, filed May 14, 1919, allowed November 4, 1919 and patented May 18, 1920, Number 1,340,861, and relates to safety appliances for pneumatic braking system used on steam, electric, street railway, and other vehicles which usually is of the "straight air" or "automatic air" type.

The main object of the invention is to provide the air brake system with safety control means whereby the human factor in the operation of a vehicle to which the automatic safety control appliances have been applied, is eliminated during such times as the vehicle shall have become dangerous and a menace to public safety by virtue of some failure of the air brake system.

One chief object of the invention is to provide safety means for automatically controlling the vehicle when through carelessness neglect, or thoughtlessness, on the part of the operator, the vehicle shall have become a menace to public safety.

Another chief object of the invention is to provide safety control means which will prevent the operation of the vehicle unless the braking system shall be in a safe and operable condition.

A further object of the invention is to provide safety control means which, if tampered with, will prevent the operation of the vehicle.

Another object of the invention is to provide control means for preventing power from being supplied to the driving means of the vehicle until such time as the air brake system has been charged with sufficient compressed air to insure the safe operation of the brakes on the vehicle.

Another object of the invention is to provide the safety power controlling means with additional means whereby the operator, only by wilfully and intentionally manipulating said additional means, may supply power to the driving means of the vehicle, whether the brake system is in an operable condition or not: but said additional means is only operable after the intentional act of the operator has been recorded by the breaking of suitable seal means or by operating some other suitable recording means.

A further object of the invention is to construct the safety control means in such a manner that the failure of any vital part thereof will cause the brakes to be applied and simultaneously shut off the power applied to the driving means of the vehicle.

Another object of the invention is to provide means which will prevent the further operation of the vehicle, after the automatic safety control has caused the brakes to be applied and the power has been shut off from the driving means of the vehicle, until such time as the defect which caused the automatic safety control to function has been repaired or proper safety precautions have been taken.

One feature of the invention consists in substituting suitable pneumatically operated means for the electric solenoid means shown in our patent hereinbefore referred to.

Another feature of the invention consists in substituting a suitable pneumatic circuit for the electric circuit which controls the power supplying means in the above mentioned patent.

A further feature of the invention consists in applying as an attachment the improvements herein described to the usual air brake systems without altering any of the parts of the regular or standard equipment of that system.

Another feature of the invention consists in providing suitable pneumatically controlled means for controlling the "automatic air" brake triple valve exhaust port in addition to the usual operator's control valve.

Another feature of the invention consists in supplying an additional air storage reservoir in addition to those usually furnished as part of the regular equipment of either the "straight air" or "automatic air" brake systems.

The feature of the invention is the simplicity of the parts of construction and the ease with which the same may be applied as an attachment to either the "straight air" or "automatic air" brake systems without altering any of the regular equipment included in these systems.

Another feature of the invention is the provision of means associated with the circuit breaker or power controlling means and the auxiliary source of pressure so that when it is desired to operate the vehicle the brakes may be simultaneously released and the circuit breaker operably positioned after the foregoing have been actuated by a mechanical or pneumatic failure.

The full nature of the invention, including objects and features not enumerated, will be more readily understood by reference to the accompanying drawings and the following description and claims In the drawings Fig. 1 is a plan view of an electrically propelled railway car or coach to which the preferred and selected embodiment of the automatic safety control has been applied, and in this instance the brake system shown is what is technically known as a "straight air" brake system.

Fig. 2 is a diagrammatic elevational view of the same showing in particular the pneumatically controlled circuit breaker and the safety control mechanism associated therewith.

Fig. 3 is an enlarged perspective view of the operator's air brake control valve, automatic safety control valve, and connections thereto and therebetween as illustrated in Figs. 1 and 2.

Figs. 4 and 5 are central sectional views taken along the horizontal and longitudinal axes of the automatic safety control valve shown in perspective in Fig. 3 and illustrates the parts in two extreme positions. In Fig. 4 the parts are shown in the position assumed by the same when the brakes have been applied, while in Fig. 5 the parts are in the brake releasing position.

Figs. 6 and 7 are partial, central, vertical sectional views taken on the line 6—6 of Fig. 4 and the line 7—7 of Fig. 5 respectively.

Figs. 8 and 9 are transverse, central sectional views taken on the line 8—8 of Fig. 6 and line 9—9 of Fig. 7 respectively. Fig. 8 illustrates the parts in the position assumed when the brakes have been applied and the power controlling means locked to prevent power being supplied to the vehicle.

Fig. 9 illustrates the same parts in the brake releasing position which places the power circuit controlling means in operative condition.

Fig. 10 is a view similar to Figs. 8 and 9 showing the position assumed by the parts after the breaking of the operating spring means or failure of the spring mechanism which is substantially equivalent in effect upon the circuit breaker as when the parts are in the position shown in Fig. 8.

Fig. 11 is a sectional view of a circuit breaker provided with pneumatic controlling means, showing the parts in the pneumatic controlled closed circuit position.

Fig. 12 is a similar view showing the parts in the circuit breaking or open circuit position after the pneumatic safety control means has operated.

Fig. 13 is a view similar to Figs. 11 and 12 showing the circuit breaker controlling parts maintained in the closed circuit position after the manual controlling means has been manipulated, whereby the operator intentionally permits power to be applied to the driving means of the vehicle.

Fig. 14 is a side elevational view of the circuit breaker illustrating additional and independent manual manipulating means, which is a part of the circuit breaker, in circuit breaking or open circuit position.

Fig. 15 is a diagrammatic view of the invention when applied to an "automatic air" brake system, including the automatic safety control, the triple valve exhaust port control valve and the auxiliary reservoir, said parts being shown in the brake releasing position with the exhaust port control valve, brake cylinder and auxiliary reservoir thereof being shown in section.

Fig. 16 is a central sectional view of the triple valve exhaust port control valve in the closing position.

In Figs. 1 to 14 inclusive the preferred embodiment of the invention is illustrated and will be described as applied to a "straight air" brake system.

In Figs. 15 and 16 the same embodiment of the invention is illustrated and will be described as applied to an "automatic air" brake system.

In Figs. 1 and 2, 20 indicates an electrically propelled vehicle, coach or car provided with wheels 21, the car being equipped with "foundation" brake mechanism, not shown. Suitably positioned upon said car is the usual brake cylinder 22 supplied in this instance with compressed air from an air storage reservoir 23, said reservoir being supplied with air by a suitable pump mechanism 24 or from stations suitably positioned along the line of operation of the vehicle. Suitable conduit means 25 and 26 connect the air storage reservoir 23 and the brake cylinder 22 respectively to the operator's valve 27. In Fig. 1 the vehicle is also shown provided with a suitable hand brake 28 and the motor power controller 29, all of which are of the usual construction.

In Fig. 2 a circuit breaker 30 is shown provided with a manually operated rod member 31 and pneumatic controlling means 96 is pneumatically connected by means of a conduit 32 to the improved automatic safety control valve 33. In the present instance the solenoid 5 and the solenoid 21 of the patent hereinbefore referred to is substantially replaced by pneumatic circuit means hereinafter to be described.

As shown in Fig. 3 the regular operator's valve 27 is provided with the usual pressure indicating means 34 and the conduit 35 which exhausts to the atmosphere. Also the usual cut-out cock or valve 36 is provided in the supply line 25 and the casing of the operator's valve 27 is suitably notched as at 43 and 44 to indicate the various positions assumed by the handle 42. A suitable bypass conduit 37 is in communication with the feed line 25 before the same enters the operator's valve 27. The conduit 37 also communicates with the automatic safety control valve 33 and, through means therein and hereinafter to be described, with the conduit 32, 38, and 26 (see Fig. 3). The conduit 32 connects the automatic safety control valve 33 with the pneumatic circuit breaker control 96 (see Fig. 2). The conduit 38 (see Fig. 1) connects the automatic safety control valve with the auxiliary reservoir 39, while the conduit 26 connects the automatic safety control valve with the brake cylinder 22 (see Fig. 1). In Fig. 3 a suitable conduit 41 also connects the operator's valve 27 with the automatic safety control valve 33.

As illustrated in Figs. 1, 2 and 3 air from the storage reservoir 23 is supplied through the conduit 25 to the operator's valve 27 and by the usual manual manipulation of the handle 42, (see Fig. 3) may be permitted to flow through the conduit 41, and by means to be hereinafter described through automatic safety control valve 33 and conduit 26 to the brake cylinder 22.

The improved automatic safety control valve is shown in detail in Figs. 4 to 10 inclusive in which 33 indicates the valve casing or body, $33^a$ a bushing, $33^b$ suitable packing to prevent leakage around said bushing, and $33^c$ a cap or nut for retaining said bushing and packing within the casing and upon the shoulder $33^d$. Within the bushing $33^a$ is a port $41^a$ communicating with the conduit 41. The reduced inner end of the bushing $33^a$ is tapered inwardly to form a receiving valve seat 63 for a suitable piston valve member 45, the latter having ports 62 and 64. Also within the casing member 33 is a chamber 47 communicating with chamber $47^a$ which in turn communicates with the conduit 26. The chamber 47 communicates with the chamber $47^b$ within the bushing $33^a$ through the ports 64, when the parts are in the position shown in Figs. 5, 7 and 9. A chamber 49, in the casing 33, is in communication with the chamber 48 through the port $49^a$, chamber $50^a$, and port 50, Figs. 4, 5, 6 and 7. A chamber 59 communicates with the chamber 48 through the conduit or port 58, Figs. 4 to 10, by means hereinafter to be described. The chamber 48 is in direct communication with the main supply line 25 through the conduit 37.

The chamber 47 is in communication with the chamber 49 through the ports 62 when the parts have assumed the position shown in Figs. 4, 6 and 8, and is also in communication with chamber $47^b$ through the ports 64 when the parts have assumed the position shown in Figs. 5, 7, 9 and 10. Suitable packing $61^a$ and packing nut $61^b$, Figs. 4 and 5, prevent leakage around the piston rod 61 between the chambers 49 and 59.

Within the chamber 59, Figs. 4 and 5, is a suitable piston member 60 positioned on the rod member 61 and is adapted to seat at $66^a$ on the chamfered inner end of the cap member 66. The piston 60 is provided with suitable ring packing $60^c$ and is cored out to receive a pair of concentric helical springs 68 and 69. To prevent leakage between the piston rod 61 and piston 62, suitable packing $60^a$ and a packing nut $60^b$ are provided.

The cap 66 has an opening 67 in the end communicating with the atmosphere and is suitably cored out to receive one end of the spring 68. The other concentric spring 69 is of proper tension to hold the piston valve 45 on its seat 46, (see Fig. 5) in the casing member 33, against the pressure in the chamber 49 but permits the piston 60 to move to its seat $66^a$ on the inner end of the cap 66 when operating air pressure is supplied to the chamber 59. The spring 68 is of sufficient tension to hold the piston valve member 45 on its seat 63, as shown in Fig. 4, during such times as there is not sufficient pressure in the chamber 59 to overcome the pressure of said spring 68. The rod 61 is herein shown shouldered at $61^a$ to permit the piston 60 to engage said shoulder (see Fig. 4), to move the piston valve member 45 to the seated position.

The means for connecting the chamber 59 to the chamber 48 comprises a bushing 53, (Figs. 6 to 10 inclusive) within the casing member 33, and suitably packed against leakage at $53^b$. The bushing 53 is held in place by a hollow elongated nut 71. The bushing 53 is slotted to form the superpositioned ports 57 and 70, (see Figs. 8, 9 and 10) which at all times are in free communication with the passage 58. Also within the bushing 53 are the valve seats 53ª and 81 with the port 54 therebetween communicating with the chamber 48.

The inner end of the elongated nut 71 is tapered to form a suitable valve seat 73, (see Figs. 6 to 10 inclusive) and the lower hollow end of said nut is internally threaded to receive the check nuts 77ª and 77ᵇ, which secure the helical spring 76 in the chamber 72. The nuts 77ª and 77ᵇ each have an opening 78 registering with an opening 80 in the protecting cap member 79, whereby the chamber 72 communicates with the atmosphere.

The bushing 53 is bored out to form a chamber 55 within which is the other check valve 56 having one end adapted to seat at 53ª, Figs. 6 and 8, and the other at 73, Figs. 7, 9 and 10. Within the check valve 56 is another check valve 75 normally in engagement with a seat 75ª in the check valve 56 and held in this position by the helical spring 76.

A rod 82 upon the check valve 75 extends upwardly and loosely through a port 74, the same extending through said check valve 56. Said rod extends through the chamber 55 and through the registering port 54 into the chamber 48 and carries on its upper end a valve 83 which is adapted to seat at 81, see Fig. 10. It will be noted that the rod 82 is of sufficient length to hold the check valve 83 off the seat 81 when the check valve 56 is seated at 73 as in Figs. 8 and 9.

The helical spring 76 holds the slidable check valve 56 on its upper seat 53ª during such times as the air pressure in the chamber 55 is less than the tension of said spring.

Within the chamber 50ª (see Figs. 6 and 7) is a check valve member 51 held against its seat 50ᵇ by a spring 52. The outer end of the chamber 50ª is closed by suitable packing 52ª and a nut 52ᵇ which is bored out at 52ᶜ to receive one end of the check valve stem 51ª. The opposite end of the valve stem 51ª extends through the chamber 48 and is receivable in a guide slot 51ᵇ formed in the casing member 33.

The operation of the automatic safety control valve will be described with suitable reference to the accompanying drawings and the foregoing description, so that the same will be readily understood.

The parts are normally positioned as shown in Figs. 4 and 6. Compressed air from the reservoir 23, (see Figs. 1 and 2) passes from the conduit 25 into the bypass conduit 37 and also into the operator's valve 27. The air entering the conduit 37 first passes into the chamber 48 (see Figs. 6, 7, 8 and 9) and is then directed to a plurality of means. The spring 52, in the chamber 50ª, having only sufficient tension to hold the valve 51 on its seat, is forced open by the pressure of the air entering the chamber 48 which permits the compressed air to pass through the port 49ª into the chamber 49. Since the chamber 49 is in communication, through the conduit 38, with the auxiliary reservoir 39 air pressure would build up in the auxiliary reservoir 39 until the pressure in the same was equal to the pressure in the storage reservoir 23.

As the piston valve 45 is normally positioned as shown in Fig. 4, because of the pressure exerted by the spring 68 on the piston 60 and the air pressure in the chamber 49, air passes through the ports 62 in the piston valve 45 into the chamber 47. Since the chamber 47 is always in communication with the chamber 47ª and with the conduit 26, air would enter the brake cylinder 22 until the pressure in the brake cylinder 22 was equal to that in the reservoirs 23 and 39, thus causing the brakes on the vehicle to be applied in the usual manner.

Another portion of the air supplied to the chamber 48 passes through the port 54, in the bushing 53, (see Figs. 6 to 10 inclusive) into the chamber 55 and when sufficient pressure has accumulated in the chamber 55 to overcome the tension of the spring 76, the check valve 56 is forced from its seat 53ª (see Fig. 6) and into position to seat at 73, (see Fig. 7) on the inner end of the elongated nut 71. This movement of the valve 56 closes the port 70, which is normally in communication with the atmosphere through the chamber 72, and places the port 57 also leading into the passage 58, in communication with the chamber 55 whereupon the compressed air passes through the passage 58 into the chamber 59.

Since the area of the piston 60 exceeds that of the piston valve 45 and the pressures in chambers 49 and 59 are equal, the piston 60 compresses the spring 68 and seats itself at 66ª, (see Fig. 5). Simultaneously the piston valve 45, carried by the rod 61, would be caused to seat at 46, by virtue of the tension of the spring 69 which, as previously explained is strong enough to overcome the oppositely directed pressure in the chamber 49 against the piston valve 45.

This action cuts off communication between the chambers 47 and 49, by closing the ports 62, and establishes direct communication between the brake cylinder 22, see Fig. 1, and the operator's valve 27, through the conduit 26, the chamber 47ª, the chamber 47, ports 64, chamber 47ᵇ, port 41ª, and conduit 41 (see Fig. 5). By manual manipulation of the lever 42 of the operator's valve, see Fig. 3, the air in the brake cylinder is released, causing the brakes on the vehicle to be released in the usual manner.

After the brakes have been released the car or vehicle is in operative condition and the parts of the automatic safety control valve remain in the position shown in Figs.

5, 7 and 9 until some defect causes the air pressure in the chamber 48 to fall below the pressure exerted by the spring 76 on the check valve 56 whereupon the check valve 56 is forced from its seat 73 and seats at 53ª.

The foregoing movement of the check valve 56 cuts off communication between the chamber 55 and the port 57 and establishes communication between the chamber 59 and the atmosphere, through the passage 58, port 70, chamber 72, ports 78 and port 80, see Figs. 6 and 8, thus releasing all pressure against the piston 60 which again assumes the position shown in Fig. 4, by virtue of the pressure of the spring 68 against the piston 60 aided by the air pressure against the piston valve 45 in the chamber 49. This movement of the piston valve 45 and the piston 60, from the position shown in Fig. 5 to that shown in Fig. 4, closes communication between the operator's valve 27 and the brake cylinder 22 by causing the piston valve 45 to seat at 63 thus closing the ports 64, which prevents the operator from interfering with the operation of the automatic safety control valve.

As previously explained when the parts have assumed the position shown in Fig. 4, direct communication is established between the auxiliary reservoir 39 and the brake cylinder 22 through the conduits 38 and 26, thus applying the brakes on the vehicle. It will be remembered that the pressure in the auxiliary reservoir 39 was built up to a pressure equal to that carried in the reservoir 23 and any escape from the reservoir 39 is prevented by the action of the spring 52, which, when the pressure in the chamber 48 is less than that in the auxiliary reservoir, causes the check valve 51 to close the port 50, thus preventing any air from flowing into the chamber 48 from the reservoir 39.

Since the parts have again assumed their normal position, as shown in Fig. 4, and can only be placed in operative position by the storing of sufficient pressure in the reservoir 23 and the chamber 55 to overcome the pressure exerted by the spring 76, it is evident that the communication between the brake cylinder 22 and the operator's valve 27 will be closed and the brakes will remain applied until the defect which caused the failure is repaired, or proper safety precautions taken, as will be explained later.

As previously stated one of the objects of this invention is to prevent the operation of the vehicle should any of the operative parts of the automatic safety control valve be broken or tampered with. If during the normal operation of the vehicle, the parts then being in the position shown in Figs. 5, 7 and 9, should any vital part of the safety control valve 33 become broken or loose, the valve means would operate to apply the brakes. Thus if the piston valve 45 become detached from the rod 61, the air pressure in the chamber 49 would force the piston valve 45 from its seat 46 and cause it to seat at 63, thereby opening the passage from the auxiliary reservoir 39 to the brake cylinder 22 as previously explained.

Should the rod 61 break, the spring 69 break, or the nuts 69ª become loose, there would be no means to hold the piston valve 45 upon the seat 46, as shown in Fig. 5. If the cap 66 were loosened or removed the air in the chamber 59 would leak past the seat 66ª and packing 60ᶜ since the latter would then be unsupported and the piston valve 45 having nothing to hold it upon the seat 46 would function again.

Although the removal of the cap 79 would have no effect upon the operation of the valve, the removal of the nut 71, however, reduces the tension of the spring 76 or removes the same entirely, and this causes the check valve 83 to seat at 81, see Fig. 10, and prevent the escape of air from the chamber 48. Since the valve 56 with the removal of said nut would have no seat as at 73, air would leak from the port 57 into the chamber 55, then past the valve 56 and through the port 74 and exhaust the pressure in the chamber 59 thereby causing the valve 45 to operate as heretofore described.

The removal of the check nuts 77ª and 77ᵇ or the removal of, or the breaking of the spring 76 would cause the parts to assume the position shown in Fig. 10 and the air in the chamber 59 would exhaust to the atmosphere through the passage 58, port 57, chamber 55, port 74 and chamber 72, thereby causing the valve 45 to operate in the manner previously described.

As hereinbefore stated the passage 58 communicates with the circuit breaker control 96 by means of the conduit 32. From the following description and by reference to Figs. 11 to 14 inclusive the circuit breaker control will be readily understood. The circuit breaker control 96 is illustrated in detail, but the actual circuit breaking means 30 is omitted, since any convenient circuit breaking means may be suitably connected to the actuating means herein disclosed.

The circuit breaker control 96 is attached to the usual circuit breaker 30 by means of suitable supports 30ª and 30ᵇ and a transverse bracket member 87. The control supporting means is held in place by suitable lock nuts 91ª and consists of a casing member 91 chambered to receive a spring 89 and piston 90, the latter being provided with suitable packing means or rings 95. The piston member 90 is in the form of a valve seatable at 90ª. Attached to the piston 90 and projecting through the chambered casing 91 is a rod member 88 having upon its extreme end the lock nuts 92.

A locking lever or latch 84, which is part of the circuit breaker 30 is pivotally supported at 84ᵃ and carries upon one end a bushing 93ᵃ, the latter being held in place by the nut 93 and being insulated from the lever 84 by suitable insulation means 93ᵇ. The opening through the bushing 93ᵃ is large enough to permit the lever 84 to rock or tilt upon its axis 84ᵃ independently of the rod 88, see Figs. 12 and 14. The lever 84 carries a latching projection 85 adapted to engage the pawl 86, attached to the handle 105, see Fig. 2, all of which are parts of the circuit breaker 30 and are provided to permit the operator to place the circuit breaker in circuit closing position.

The means for manually operating the circuit breaker 30 is clearly shown in Figs. 2 and 11 to 14 inclusive. The push rod 31 is slidably supported by the circuit breaker casing 30 and the free end thereof terminates within said casing adjacent the lever 84. The circuit is opened by striking the outer end of the rod 31, whereby the inner end is brought in contact with the free end of the lever 84 causing it to tilt the same and raise the latching projection from engagement with the pawl 86 which releases the circuit breaking means to open the power circuit.

Attached to the casing member 91, of the circuit breaker control 96, is a bushing or cylinder head 94ᵃ provided with a chamber 94 which communicates with the conduit 32. Projecting into the chamber 94 through the head 94ᵃ is a rod member 97, the lower end of which is adapted to engage the piston 90, see Fig. 13. Suitable packing means 97ᵃ and locking nut 97ᵇ are provided to prevent leakage from the chamber 94 past the rod 97.

Attached to the bushing 94ᵃ is the cap 99 having a reduced outer end provided with an elongated slot 103. Projecting transversely through the rod 97 is a pin 102 short enough to pass lengthwise through the elongated slot 103. The pin normally rests on the outer end of the cap 99 and maintains the rod 97 in the position shown in Fig. 11. The cap 99 also has a hole 99ᵃ at right angles to the slot 103, and the rod 97 has a hole 98ᵃ in alignment with the hole 99ᵃ to permit a pin 98 to pass through the cap 99 and rod 97 to hold the rod 97 in the position shown in Figs. 11 and 12.

In the outer end of the pin 98 is provided a hole through which a wire 101 is passed and a suitable seal 100 may be affixed. The rod member 97 also carries the handle or insulating knob 104.

As previously explained Figs. 11 and 13 illustrate the position assumed by the parts when the circuit is closed, or power is being supplied to the driving means of the vehicle, and Figs. 12 and 14 illustrate the position assumed by the parts when the circuit is open or power is shut off from the vehicle.

Since the operation of the circuit breaker control 96 depends upon the operation of the automatic safety control valve 33 reference will be had to Figs. 4 to 10 inclusive. When the parts of the automatic safety control valve 33 are in the position shown in Figs. 4, 6 and 8 it will be remembered that there is no air pressure in the passage 58, consequently there would be none in the conduit 32, which communicates with the passage 58, see Figs. 8, 9 and 10. Since the spring 89 is of sufficient tension to hold the piston 90 in the position shown in Fig. 12, when the chamber 94 is not under pressure, the rod 88 will tilt the lever 84 and prevent the projection 85 from engaging the pawl 86. This prevents any power being supplied to the vehicle, through the regular source, since no matter how often the handle 105, see Fig. 2, was actuated, the latch 85 is not in a position to engage the pawl 86.

When the parts of the automatic safety control valve 33 are in the position shown in Figs. 5, 7 and 9, air would pass through the passage 58 and conduit 32 into the chamber 94. When sufficient pressure has accumulated in the chamber 94 to overcome the tension of the spring 89 the piston 90 would be forced from the position shown in Fig. 12 to that shown in Fig. 11 and seat at 90ᵃ which would permit the circuit closing means to be maintained in the circuit closing position when the handle 105 was actuated.

Since no air can enter the passage 58 until sufficient pressure has been stored in the reservoir 23 and auxiliary reservoir 39 to insure safe braking power, the circuit controlling means will be held open until this pressure is attained. When the parts of the automatic safety control valve 33 are in the position shown in Figs. 4, 6 and 8, the air in the passage 58 is in communication with the atmosphere hence the pressure in the chamber 94 and conduit 32 would exhaust to the atmosphere, the spring 89 would cause the piston 90 to move upwardly and disengage the latching projection 85 from the circuit controlling pawl 86 to open the circuit.

In the event that conditions are met with, which would prevent the operation of the air brake system or there may be a pneumatic or a mechanical failure thereof; it may be desirable to operate the vehicle, and for this reason the manual manipulating means of the circuit breaker control is provided to maintain the piston 90 in the closed circuit position, otherwise it would not be possible to supply power to the vehicle.

The operator, to permit power to be supplied to the vehicle through the circuit breaker, or other power controlling means, therefore, must intentionally operate the circuit breaker control and record this action by the breaking of a seal or by the operation of some other suitable recording means. By breaking the seal 100 and removing the wire 101, the pin 98 may be removed from the cap 99 and the rod 97. This permits the rod 97 to engage the upper end of the piston 90 by turning the rod 97 one quarter turn, whereupon the pin 102 will pass through the elongated slot 103 and enter the chamber 96$^a$, when by turning another quarter turn, so as to position the pin 102 at right angles to the slot 103, the pin 102 rests on the inner side of the cap 99, since the spring 89 tends to force the piston 90 outwardly. The movement of the rod 97 passing from the position shown in Fig. 11 to that shown in Fig. 13 is sufficient to cause the piston 90 to mechanically seat at 90$^a$ and permit the projection 85 to be positioned to engage the pawl 86 when the operator operates the circuit breaker handle 105 to supply power to the vehicle.

Should the spring 76, or the conduit 32 break, or any serious air leaks develop therein or in the chamber 94, in the packing 95 or lock 97$^a$, the air pressure holding the piston 90 on its seat 90$^a$ would fall below the pressure exerted by the spring 89 and the piston 90 would be forced upwardly thereby causing the power to be shut off simultaneously with the exhaustion of the pressure in the chamber 59, whereby the automatic safety control valve would operate to apply the brakes. Consequently, should the automatic safety control valve operate to apply the brakes the air in the conduit 32 would be exhausted causing the power to be shut off in the manner described.

Should the spring member 89 of the circuit breaker 98 break or fail to function it would not interfere with the normal operation of the car as the piston 90 would be held in operative position by air pressure in the chamber 94.

It will be noted that the braking power upon any vehicle is usually or normally greater in amount than the traction driving power, and should the spring 89 break or fail, the application of the brakes will bring the vehicle to a stop although the power is not shut off. But with the present type of circuit breakers, the overload coil thereof will open said breaker when the above overload resulting from the application of the brakes is produced. After this condition has occurred, the circuit breaker control is always in position to be operated, so that the handle 105 may be actuated to again supply power to the vehicle, but as will be remembered, the brakes on the vehicle will remain applied until sufficient braking pressure is built up in the system.

When a mechanical or pneumatic failure of the brake system has occurred it will be remembered that the power is automatically cut off from the vehicle and the brakes are applied by reason of the auxiliary source of pressure. If the failure mentioned is such that sufficient braking pressure cannot be built up in the system or the original source of pneumatic pressure, the brakes would remain applied and the vehicle could not be operated, since the usual overload circuit breaker would immediately open the power circuit because the braking power of a vehicle in a stationary position usually exceeds the tractive power upon the same. To operate the vehicle in spite of said failure requires the release of the brakes, which means the bleeding or release of the auxiliary reservoir and brake system associated therewith, and the intentional operation of the circuit breaking control means 96 to permit power to be supplied to the vehicle.

To facilitate this last operation, means is provided for simultaneously operating the circuit breaking control means 96 and bleeding or draining the auxiliary source of pressure and associated brake system to release the brakes. This means comprises a conduit or pipe 232 connecting the auxiliary reservoir 39, see Figs. 1 and 15, to the circuit breaker control 96. The conduit adjacent the reservoir 39, is provided with suitable valve means 233, such that should a leak or failure develop in the conduit 232 or the means associated therewith, the reservoir could be cut off from said conduit and function as heretofore described. In this instance however, a valve 139 is provided on the auxiliary reservoir, which valve may be used for cleaning purposes as well.

The means included in the circuit breaker control 96 associated with the conduit 232 is shown in detail in Figs. 11, 12 and 13. The push rod 97 is provided with a longitudinal slot 234 which communicates with the atmosphere in all positions of the rod. In the present instance the insulated handle 104 is provided with a slot 235 which communicates with the slot 234 to permit discharging to the atmosphere. The slot 234 terminates short of the rod 97 and communicating therewith are the radial ports 236, one of which is adapted to register with one end of the channel 237, only when the rod 97 is in the position shown in Fig. 13, said channel 237 being formed in the head 94$^a$, as shown. The other end of the channel 237 communicates with the conduit 232 such that when the push rod is positioned as illustrated in Fig. 13 the auxiliary reservoir 39 is permitted to exhaust to the atmosphere through the valve 233, conduit 232, channel 237, ports 236, slot 234 and slot 235. Suitable packing means 97ª and securing means 97ᵇ prevent leakage between the channel 237 and the chamber 96ª to the atmosphere and channel 237 and chamber 94 respectively.

Under various conditions the pressures obtained in the channel 232 and chamber 94 vary, sometimes one exceeding the other under certain operating conditions and vice versa, and sometimes both being equal or both being without pressure. The simultaneous release of the brakes and repositioning of the circuit breaking control means will be understood from the foregoing description, since the actuation of the push rod in the manner described accomplishes this result. The actuation of the push rod 97, however, it will be remembered, must be recorded by the breaking of a seal means or otherwise suitably recorded. The vehicle after the push rod 97 has been actuated is released from the brakes, and the circuit breaker permits power to be supplied to the vehicle as shown.

The foregoing specification has been described both as to structure and operation, assuming that the parts were applied to a "straight air" brake system. In Figs. 15 and 16, however, the improved circuit breaker 30, the auxiliary reservoir 39, and the air safety control valve 33 are shown incorporated in a regular "automatic air" brake system.

In the "automatic air" brake system the essential parts of the regular equipment of a train consists of the following: an air compressor, a storage reservoir, an operator's valve, an auxiliary reservoir, triple valve and brake cylinder. The compressor, operator's valve and storage reservoir are usually located on the driving means of the train, while each vehicle is equipped with a brake cylinder, triple valve and an auxiliary reservoir, all of which are connected to each other by suitable conduit means in the regular manner.

The air compressor compresses the air and stores it in the storage reservoir from whence it flows through suitable conduit means through the operator's valve to the triple valve on each vehicle. It is then permitted to flow into the auxiliary reservoir on the vehicles comprising the train until an equal, predetermined pressure is built up in each auxiliary reservoir 40.

So long as the predetermined pressure is maintained in the auxiliary reservoir the brakes on the train remain in the release position, but should the pressure fall due to a failure of any of the equipment or through the operation of the operator's valve, the triple valve on each car is caused to operate to permit air to enter the brake cylinder and apply the brakes on the train.

The automatic safety control valve as used on the "automatic air" brake system is of the same construction and operation as on the "straight air" brake system except that the port 41ª is not required and is closed by replacing the conduit 41 with a suitable plug 132. The same power controlling means is used without alteration and its operation is the same as herein before described.

Fig. 15 is a diagrammatic sectional view of an "automatic air" brake system in which 110 indicates the operator's valve, 25, 133, 134 and 135 suitable conduit means connecting the storage reservoir, not shown, to the triple valve 112, auxiliary reservoir 40, and brake cylinder 22. Within the reservoir 40 is the conduit 140 which connects the triple valve to the brake cylinder 22. The conduit 133 is connected to the automatic safety control valve 33 at 37, Fig. 6, through the conduit means 136 and 137. The conduit 26 connects the chamber 47ª of the automatic control valve 33 with the brake cylinder 22 at 142. The conduit 32 and 131 connects the automatic safety control valve 33, the circuit breaker control 96, see Fig. 2, and the triple valve exhaust port control valve 144, see Fig. 15. Leading from the chamber 49 of the automatic safety control valve 33 is the conduit 38 connecting the auxiliary reservoir 39 as in the "straight air" brake system.

Fig. 16 is a sectional view of the triple valve exhaust port control valve 114 showing the parts in the exhaust port closing position and having a casing member 114ª. Within the casing 114ª is a port 118ª connecting a chamber 117 with the triple valve exhaust port 113 by the conduit 118. Leading from the chamber 117 is the port 121, the inner end of which is tapered to form a valve seat 119 for the valve 120 controlling said port. A rod member 123 extends through the partition wall between the chambers 116 and 115 carrying the valve 120 on one end and the piston 124 on the other end and in the respective chambers. To prevent leakage between the chambers 115 and 116, suitable packing 116ª and packing nut 116ᵇ is provided. The chamber 116 is provided with a port 122 which is preferably threaded to receive the usual retainer valve when the same is used, otherwise the port 122 discharges directly into the atmosphere, as shown.

The outer end of the casing 114ª is interiorly and exteriorly threaded to receive the caps 126 and 128 respectively which are provided with the ports 127 and 129 respectively.

A helical spring 125 within the cap 126 is adapted to engage the piston 124 and tends to force the same downwardly to seat the valve 120 upon the seat 119, as shown in Fig. 16, to cut off the communication between the triple valve exhaust port 113 and the atmosphere exhaust port 122.

Normally the parts of the automatic safety control are in the position shown in Figs. 4, 6, 8, 12 and 16. Air entering the conduit 25, see Fig. 15, passes through the operator's valve 110 into the conduit means 133, 134, 135, 136 and 137, triple valve 112 into the auxiliary reservoir 40. The air which simultaneously enters the chamber 48, see Fig. 6, passes into the chamber 50$^a$, thence through the port 49$^a$ into the chamber 49 and from there passes into the auxiliary reservoir 39, through the conduit 38. From the chamber 49 the air also enters the chamber 47 through the ports 62, see Fig. 4, and passes through the chamber 47$^a$ into the conduit 26, and then into the brake cylinder 22 at 142, causing the brakes to be applied. As will be remembered the circuit breaker control in its normal position prevents power from being supplied to the vehicle, consequently the vehicle would be inoperative since the brakes are applied and the power is shut off.

However, if the triple valve exhaust port control valve 114 were not provided the air would not remain in the brake cylinder 22 but would pass through the conduit 140 in to the triple valve and exhaust through the port 113, which is normally open. Since the normal position of the triple valve exhaust port control valve is as shown in Fig. 16 the port 121 is closed by the valve 120 thereby preventing any air from escaping through the exhaust port 122, which prevents the brakes from being released until sufficient pressure is built up to insure safe braking power.

When, as in the "straight air" brake system sufficient pressure has been built up in the reservoirs 39 and 40 and the chamber 55, see Fig. 6, to overcome the tension of the spring 76, which acts to insure safe braking power, air enters the passage 58, conduits 32 and 131 which causes the piston 124, see Fig. 16, to move upwardly and open the port 121, see Fig. 15, which permits the air in the brake cylinder 22 to escape to the atmosphere through the triple valve exhaust port 113, conduit 118, port 118$^a$, chamber 117, port 121. chamber 116 and port 122, thereby releasing the brakes. At the same time the air enters the circuit breaker control 96 and causes the piston valve 90 to move, see Fig. 12 to operative position, shown in Fig. 11, which places the vehicle in operative condition, that is the brakes on the vehicle or train are in the released position and power can be supplied through the circuit breaker to the driving means, as described.

As long as pressure sufficient to insure safe braking power is maintained in the pneumatic circuit, the parts will remain in operative position and the operator is free to apply and release the brakes in the usual manner. Should, however, the pressure be reduced below the pressure exerted by the spring 76 in the automatic safety control valve 33, the brakes would instantly be applied and the power simultaneously shut off in the manner hereinbefore mentioned. If the defect which caused the brake application could not be readily repaired, it then would be necessary to drain the entire brake system of all air through the drain valve 139, see Fig. 15, provided as part of the regular equipment. When the pneumatic system is drained there is no pressure to maintain the circuit breaker control in the operating or closed circuit position and it is necessary for the operator to use the manual operating means of the circuit breaker control hereinbefore described to permit power to be supplied to the vehicle and also use the hand brake on the vehicle for stopping the same.

While the automatic safety control valve 33 is illustrated and described herein as applied to what is known as a "straight air" and the "automatic air" brake systems, it will be understood that many modifications of the valve will suggest themselves to those skilled in the air brake art and these modifications it will be understood are within the broad purview of this invention. It will be likewise understood that the automatic safety control valve 33 and the various parts thereof may be applied to other air brake systems not specifically mentioned in the foregoing specifications by suitable means which will suggest themselves to those skilled in this art. Although the selected embodiment of the invention has been described in detail it will be understood that the broader features thereof are not to be limited by said description, since the same has been given so that a complete understanding of the device and mechanism will be more readily understood.

The invention claimed is:

1. A power operated vehicle having a power circuit, fluid-pressure-controlled means for breaking the circuit, manually-operated means of said fluid-pressure-controlled means for restoring said circuit, a device adapted to prevent operation of said manually operated means, and a seal for said device substantially as set forth.

2. A power operated vehicle having a power circuit, fluid-pressure-controlled means for breaking the circuit, manually-operated means of said fluid-pressure-controlled means for restoring said circuit, and means to lock said manually operated means in place, substantially as set forth.

3. In a pneumatically operated brake system including a source of pneumatic pressure and brake means operable thereby, the combination of an auxiliary source of pneumatic pressure means connecting said auxiliary source of pneumatic pressure to the brake means, and pneumatically operated valve means normally maintaining a free passage from the original source of pneumatic pressure to the brake means and normally disconnecting the auxiliary source of pneumatic pressure from said brake means and adapted to connect said auxiliary source of pressure to said brake means upon a failure of pressure in the original source of supply.

4. In a pneumatically operated brake system including a source of pneumatic pressure and brake means operable thereby, the combination of an auxiliary source of pneumatic pressure, means connecting said auxiliary source of pneumatic pressure to the brake means, and single valve means normally maintaining a free passage from the original source of pneumatic pressure to the brake means and normally disconnecting the auxiliary source of pneumatic pressure from said brake means and adapted to connect said auxiliary source of pressure to said brake means upon a failure of pressure in the original source of supply.

5. In a pneumatically operated brake system including a source of pneumatic pressure and brake means operable thereby, the combination of an auxiliary source of pneumatic pressure, means connecting said auxiliary source of pneumatic pressure to the brake means, and valve means normally maintaining a free passage from the original source of pneumatic pressure to the brake means and normally disconnecting the auxiliary source of pneumatic pressure from said brake means and for connecting said auxiliary source of pressure to said brake means upon a failure of pressure in the original source of supply.

6. In a power propelled vehicle provided with a pneumatic brake system, including a source of pneumatic pressure and brake means operable thereby, the combination with means to apply the pneumatic brakes, and means to shut off the power supplied to the vehicle, of means for operating both of said means upon a reduction in pressure from a predetermined pressure, means for locking said operating means, and means for automatically releasing the locking means when a predetermined pressure is re-established.

7. In a power propelled vehicle provided with a pneumatic brake system, including a source of pneumatic pressure and brake means operable thereby, the combination with means to apply the pneumatic brakes, and means to shut off the power supplied to the vehicle, of means for simultaneously operating both of said means upon a reduction of pressure from a predetermined pressure and pneumatic means for locking said operating means and pneumatic means for automatically releasing the locking means when a predetermined pressure is re-established.

8. A power operated vehicle having a power circuit, a circuit breaker, fluid-pressure-controlled means for operating the circuit breaker including a latch engaging the circuit breaker and releasable therefrom on undue change of pressure, and manual means for restoring said latch to operative position, substantially as set forth.

9. In a power propelled vehicle provided with a pneumatic brake system, including a source of pneumatic pressure and brake means operable thereby, the combination with means to apply the brakes, and means for supplying power to the vehicle, of an auxiliary source of pressure, and means operable by a pneumatic failure of the brake system for applying the brakes and for shutting off the power supplied to the vehicle.

10. In a power propelled vehicle provided with a pneumatic brake system, including a source of pneumatic pressure and brake means operable thereby, the combination with means to apply the brakes, and means for supplying power to the vehicle, of means operable by a pneumatic failure of the brake system for shutting off the power supplied to the vehicle, and means for intentionally supplying power to the vehicle notwithstanding said power controlling means.

11. In a power propelled vehicle provided with a pneumatic brake system, including a source of pneumatic pressure and brake means operable thereby, the combination with means to apply the brakes, and means for supplying power to the vehicle, of means operable by a pneumatic failure of the brake system for shutting off the power supplied to the vehicle, means for intentionally supplying power to the vehicle notwithstanding said power controlling means, and means for regulating the operation of said intentional means.

12. In a power propelled vehicle provided with a pneumatic brake system, including a source of pneumatic pressure and brake means operable thereby, the combination with means for supplying power to the vehicle, of means operable by a pneumatic failure of the brake system for shutting off the power supplied to the vehicle, and additional means for shutting off the power independently of said pneumatic failure operable means.

13. In a power propelled vehicle provided with a pneumatic brake system, including a source of pneumatic pressure and brake means operable thereby, the combination with means for applying the brakes, and means for supplying power to the vehicle, of an auxiliary source of pressure, means operable by a pneumatic failure of the brake system for applying the brakes and for shutting off the power supplied to the vehicle, and additional means for shutting off the power independently of said pneumatic failure operable means.

14. In a power propelled vehicle provided with a pneumatic brake system, including a source of pneumatic pressure and brake means operable thereby, the combination with means for supplying power to the vehicle, of means operable by a pneumatic failure of the brake system for shutting off the power supplied to the vehicle, means for intentionally supplying power notwithstanding said power controlling means, and additional means for shutting off the power independently of said pneumatic failure operable means and notwithstanding said intentional power supplying means.

15. In a power propelled vehicle provided with a pneumatic brake system, including a source of pneumatic pressure and brake means operable thereby, the combination with means for applying the brakes and means for supplying power to the vehicle, of an auxiliary source of pressure, means operable by pneumatic failure of the brake system for applying the brakes and for shutting off the power supplied to the vehicle, means for releasing the brakes and for intentionally supplying power notwithstanding said pneumatic failure operable means, and additional means for shutting off the power independently of said pneumatic failure operable means and notwithstanding said intentional supplying means.

16. In a power propelled vehicle provided with a pneumatic brake system, including a source of pneumatic pressure and brake means operable thereby, the combination with means for applying the brakes and means for supplying power to the vehicle, of an auxiliary source of pressure, means operable by pneumatic failure of the brake system for applying the brakes and for shutting off the power supplied to the vehicle, single means for releasing the brakes and for intentionally supplying power notwithstanding said pneumatic failure operable means.

17. In a power propelled vehicle provided with a pneumatic brake system, including a source of pneumatic pressure and brake means operable thereby, the combination with means for applying the brakes and means for supplying power to the vehicle, of an auxiliary source of pressure, means operable by pneumatic failure of the brake system for applying the brakes and for shutting off the power supplied to the vehicle, means for simultaneously releasing the brakes and for intentionally supplying power notwithstanding said pneumatic failure operable means, and additional means for shutting off the power independently of said pneumatic failure operable means and notwithstanding said intentional supplying means.

18. In a power propelled vehicle provided with a pneumatic brake system, including a source of pneumatic pressure and brake means operable thereby, the combination with means for applying the brakes and means for supplying power to the vehicle, of an auxiliary source of pressure, and means operable by pneumatic failure of the brake system for applying the brakes and for shutting off the power supplied to the vehicle, means for releasing the brakes and for intentionally supplying power notwithstanding said pneumatic failure operable means, additional means for shutting off the power independently of said pneumatic failure operable means and notwithstanding said intentional supplying means, and means for recording the intentional supplying of power to said vehicle.

19. In a power propelled vehicle provided with a pneumatic brake system, including a source of pneumatic pressure and brake means operable thereby, the combination with means for applying the brakes, and means for supplying power to the vehicle, of an auxiliary source of pressure, means operable by pneumatic failure of the brake system for applying the brakes and for shutting off the power supplied to the vehicle, single means for releasing the brakes and for intentionally supplying power notwithstanding said pneumatic failure operable means, and means for recording the intentional supplying of power to said vehicle.

20. A safety control system for a pneumatic brake system including an auxiliary reservoir for pneumatic pressure and a safety control valve interposed in the pneumatic brake system for charging said auxiliary reservoir and for discharging the same into the brake system to operate the brakes independently of the pneumatic brake system.

21. In a control system a control valve including a chamber, a fluid operated piston therein, a second chamber, a second fluid operated piston in said second chamber, a rod supporting both pistons, and means for operating said rod to actuate one of said pistons.

22. In a control system a control valve including a chamber, a fluid operated piston therein, a second chamber, a second fluid operated piston in said second chamber, a rod supporting both pistons, means for operating said rod to actuate both of said pistons.

23. In a control system, a control valve including two chambers of different sizes, a piston in each chamber, pneumatic means communicating with both chambers and oppositely directed against said pistons, and means for actuating the smaller piston when the pneumatic pressure is released from the larger chamber.

24. In a control system, a control valve including two chambers of different sizes, a pneumatically operated piston in each chamber, a rod movable in both chambers and supporting both pistons, pneumatic means communicating with both chambers, said pistons being oppositely directed by said pneumatic means, means maintaining the smaller piston in a position similar to the larger piston in opposition to said pneumatic pressure whereby upon the release of the pressure in the larger chamber said smaller piston is actuated by the pressure in the smaller chamber.

25. In a control system a control valve including two chambers of different sizes, a piston in each chamber, a source of pneumatic pressure communicating with one chamber, a second source of pneumatic pressure communicating with the other chamber, said pressures being substantially equal, said pistons being oppositely directed by said pressures, and means connecting said pistons whereby the pressure exerted upon the larger piston maintains the smaller piston in a given position, the smaller piston being actuated when the pneumatic pressure is released from the larger chamber.

26. In a safety control system for power propelled vehicles, the combination of power controlling means, means for actuating said power controlling means to open the power circuit, pneumatic means for normally maintaining said actuating means in the closed circuit position, and means for actuating said power controlling means to open the power circuit independently of the pneumatic power maintaining means.

27. In a safety control system for power propelled vehicles, the combination of power controlling means, means for actuating said power controlling means to open the power circuit, pneumatic means for normally maintaining said actuating means in the closed circuit position, and means for locking said pneumatc means in the closed circuit position.

28. In a safety control system for power propelled vehicles, the combination of power controlling means, means for actuating said power controlling means to open the power circuit, pneumatic means for normally maintaining said actuating means in the closed circuit position, means for locking said pneumatic means in the closed circuit position, and means for actuating said power controlling means to open the power circuit independently of the pneumatic maintaining means and said locking means.

29. In a safety control system for power propelled vehicles, the combination of power controlling means, means for actuating said power controlling means to open the power circuit, pneumatic means for normally maintaining said means in the closed circuit position, means for locking said pneumatic means in the closed circuit position, and recording means for registering the operation of said locking means when the latter is moved to the locking position.

30. In a safety control system for power propelled vehicles, the combination of power controlling means, means for actuating said power controlling means to open the power circuit, pneumatic means for normally maintaining said actuating means in the closed circuit position, means for locking said pneumatic means in the closed circuit position, recording means for registering the operation of said locking means when the latter is moved to the locking position, and means for actuating said power controlling means to open the power circuit independently of the pneumatic maintaining means and the locking means.

31. In a safety control system for a pneumatic brake system, the combination with a source of pneumatic pressure and brake means operable thereby, of an auxiliary reservoir communicating with the original source of pressure for storage purposes, check valve means in said line of communication, and means interposed in the communication between the original source of pressure and the brake means, said means being adapted to open communication between said auxiliary reservoir and said brake means to operate the latter upon a decrease in pressure in said source of pneumatic pressure below a predetermined pressure.

32. In a safety control system for a pneumatic brake system the combination with a source of pneumatic pressure and brake means operable thereby, of pneumatically operated valve means controlling the communication between said source of pneumatic pressure and the brake means, and means for controlling the operation of said valve means.

33. In a safety control system for pneumatic brake system, the combination with a source of pneumatic pressure and brake means operable thereby, of valve means controlling the communication between said source of pneumatic pressure and the brake means, means controlling the operation of said valve means, said means including a pneumatically maintained valve, and means for actuating said pneumatically maintained valve upon a reduction in pressure below a predetermined pressure in the pneumatic circuit.

34. In a safety control system for a pneumatic brake system, the combination with a source of pneumatic pressure and brake means operable thereby, of valve means controlling the communication between said source of pneumatic pressure and the brake means, means controlling the operation of said valve means, said means including a pneumatically maintained valve, means for actuating said pneumatically maintained valve, upon a reduction in pressure below a predetermined pressure in said pneumatic circuit, and adjustable means for varying the predetermined pressure limit.

35. In a safety control system for a pneumatic brake system, the combination with a source of pneumatic pressure and brake means operable thereby, of valve means controlling the communication between said source of pneumatic pressure and the brake means, means controlling the operation of said valve means, said means including a pneumatically maintained valve, and means for actuating said pneumatically maintained valve upon a reduction in pressure below a predetermined pressure in said pneumatic circuit, and means for actuating said first mentioned valve means and operable upon a failure of said pneumatically maintained valve actuating means.

36. In a power propelled vehicle provided with a pneumatic brake system, including a source of pneumatic pressure and brake means operable thereby, the combination of an auxiliary source of pneumatic pressure, means for controlling the power supplied to the vehicle, and safety control means associated with said power controlling means and said source of pneumatic pressure for maintaining the brakes in the applied position and preventing the supply of power to the vehicle until a predetermined safe braking pressure is established in the brake system, said safety control means being operable at said predetermined pressure to release the brakes and said power controlling means, said safety control means then being operable by a pneumatic failure of the brake system to apply the brakes and prevent power being supplied to said vehicle.

37. In a power propelled vehicle provided with a pneumatic brake system, including a source of pneumatic pressure and brake means operable thereby, the combination of an auxiliary source of pneumatic pressure, means for controlling the power supplied to the vehicle, and safety control means associated with said power controlling means and said source of pneumatic pressure for maintaining the brakes in the applied position and preventing the supply of power to the vehicle until a predetermined safe braking pressure is established in the brake system, said safety control means being operable at said predetermined pressure to release the brakes and said power controlling means, said safety control means then being operable by a failure of the safety control means for preventing power to be supplied to the vehicle.

38. In a power propelled vehicle provided with a pneumatic brake system, including a source of pneumatic pressure and brake means operable thereby, the combination of an auxiliary source of pneumatic pressure, means controlling the power supplied to the vehicle, and safety control means for applying the brakes and preventing power being supplied to the vehicle, said safety control means being operable to release the brakes when a predetermined pressure has been established in the original brake system.

39. In a power propelled vehicle provided with a pneumatic brake system, including a source of pneumatic pressure and brake means operable thereby, the combination of an auxiliary source of pneumatic pressure, means controlling the power supplied to the vehicle, and safety control means for applying the brakes and preventing power being supplied to the vehicle, said safety control means being operable to release the brakes and operate the power controlling means to permit power to be supplied to the vehicle when a predetermined pressure has been established in the original brake system.

40. In a power propelled vehicle provided with a pneumatic brake system, including a source of pneumatic pressure and brake means operable thereby, the combination of an auxiliary source of pneumatic pressure, means controlling the power supplied to the vehicle, and safety control means for applying the brakes and preventing power being supplied to the vehicle, said safety control means being operable to release the brakes and operate the power controlling means to permit power to be supplied to the vehicle when a predetermined pressure has been established in the original brake system, and means associated with said auxiliary source of pressure and said power controlling means for controlling said safety control means to permit the operation of the vehicle.

41. In a power propelled vehicle provided with a pneumatic brake system, including a source of pneumatic pressure and brake means operable thereby, the combination of an auxiliary source of pneumatic pressure, means controlling the power supplied to the vehicle, and safety control means for applying the brakes and preventing power being supplied to the vehicle, said safety control means being operable to release the brakes when a predetermined pressure has been established in the original brake system, and means associated with said auxiliary source of pressure for controlling the safety control means to permit the operation of the vehicle.

42. In a brake system, the combination with a source of pneumatic pressure and brake means operable thereby, including a triple valve having an exhaust port, the combination of an auxiliary source of pneumatic pressure, valve means controlling said triple valve exhaust port, and safety control means associated with said valve controlling means for maintaining said port in closed position until a predetermined safe operating pressure has been established in the brake system.

43. In a brake system the combination with a source of pneumatic pressure and brake means operable thereby, including a triple valve having an exhaust port, the combination of an auxiliary source of pneumatic pressure, valve means controlling said triple valve exhaust port, and safety control means associated with said valve controlling means for maintaining the brakes in the applied position and said port in the closed position until a predetermined safe operating pressure has been established in the brake system.

44. In a brake system the combination with a source of pneumatic pressure and brake means operable thereby, including a triple valve having an exhaust port, the combination of an auxiliary source of pneumatic pressure, valve means controlling said triple valve exhaust port, and safety control means associated with said valve controlling means for maintaining the brakes in the applied position and said port in the closed position until a predetermined safe operating pressure has been established in the brake system, said safety control means being operable upon a failure of the brake system and being associated with said triple valve control means for applying the brakes and closing said port and maintaining the same in said positions until a predetermined safe operating pressure has been re-established in the brake system.

45. In a power propelled vehicle provided with a pneumatic brake system including a source of pneumatic pressure and brake means operable thereby, including a triple valve having an exhaust port, the combination of an auxiliary source of pneumatic pressure, means for controlling the power supplied to the vehicle, valve means controlling said triple valve exhaust port, and safety control means associated with said power controlling means, brake means and said exhaust port controlling valve means to maintain the brakes in the applied position and to prevent the supply of power to the vehicle until a predetermined safe braking pressure is established in the brake system, said safety control means being operable at said predetermined pressure upon said exhaust port for releasing said brakes and said power controlling means.

46. In a power propelled vehicle provided with a pneumatic brake system including a source of pneumatic pressure and brake means operable thereby, including a triple valve having an exhaust port, the combination of an auxiliary source of pneumatic pressure, means for controlling the power supplied to the vehicle, valve means controlling said triple valve exhaust port, and safety control means associated with said power controlling means, brake means and said exhaust part controlling valve means to maintain the brakes in the applied position, to prevent the supply of power to the vehicle until a predetermined safe braking pressure is established in the brake system, said safety control means being operable at said predetermined pressure upon said exhaust port for releasing said brakes and said power controlling means, said safety controlling means then being operable by pneumatic failure of the brake system to close said triple valve exhaust port, apply said brakes and prevent power to be supplied to said vehicle.

47. In a power propelled vehicle provided with a pneumatic brake system including a source of pneumatic pressure and brake means operable thereby, including a triple valve having an exhaust port, the combination of an auxiliary source of pneumatic pressure, means for controlling the power supplied to the vehicle, valve means controlling said triple valve exhaust port, and safety control means associated with said power controlling means, brake means and said exhaust port controlling valve means to maintain the brakes in the applied position and to prevent the supply of power to the vehicle until a predetermined safe braking pressure is established in the braking system, said safety control means being operable at said predetermined pressure upon said exhaust port for releasing said brake and said power controlling means, said safety controlling means then being operable by a pneumatic failure of the brake system to close said triple valve exhaust port, apply said brakes and prevent power to be supplied to said vehicle, said safety controlling means being operable to open said closed port, release said brakes and permit power to be supplied to said vehicle when the predetermined safe operating pressure is re-established in the brake system.

48. In a power propelled vehicle provided with a pneumatic brake system including a source of pneumatic pressure and brake means operable thereby, including a triple valve having an exhaust port, the combination of an auxiliary source of pneumatic pressure, means for controlling the power supplied to the vehicle, valve means controlling said triple valve exhaust port, and safety control means associated with said power controlling means, brake means and said exhaust port controlling valve means to maintain the brakes in the applied position and to prevent the supply of power to the vehicle until a predetermined safe braking pressure is established in the braking system, said safety control means being operable at said predetermined pressure upon said exhaust port for releasing said brakes and said power controlling means, said safety controlling means then being operable by a pneumatic failure of the brake system to close said triple valve exhaust port, apply said brakes and prevent power to be supplied to said vehicle, and means associated with said auxiliary source of pressure and said power controlling means for controlling said safety control means to permit the operation of the vehicle notwithstanding the operation of said safety control means to maintain said brakes in the applied position and prevent power to be supplied to said vehicle.

49. In a power propelled vehicle provided with a pneumatic brake system, including a source of pneumatic pressure and brake means operable thereby, the combination of an auxiliary source of pneumatic pressure and means for controlling the power supplied to the vehicle, and safety control means associated with said power controlling means and said source of pneumatic pressure for maintaining the brakes in the applied position and preventing the power supplied to the vehicle until a predetermined safe braking pressure is established in the brake system, said safety control means being operable at said predetermined pressure to release the brakes and said brake control means, said safety control means then being operable by a failure of the safety control means to apply the brakes and prevent power being supplied to the vehicle.

In witness whereof, we have hereunto affixed our signatures.

LUI F. HELLMANN.
WILLIAM W. BAXTER.